(12) United States Patent
Mortensen et al.

(10) Patent No.: US 11,293,411 B2
(45) Date of Patent: Apr. 5, 2022

(54) TOWER VIBRATION DAMPER

(71) Applicant: Vestas Offshore Wind A/S, Aarhus N. (DK)

(72) Inventors: Peter Sigfred Mortensen, Risskov (DK); Miroslava Vastlová, Pezinok (SK)

(73) Assignee: Vestas Wind Systems A/S

( * ) Notice: Subject to any disclaimer, the term of this patent is extended or adjusted under 35 U.S.C. 154(b) by 156 days.

(21) Appl. No.: 16/640,525

(22) PCT Filed: Sep. 4, 2018

(86) PCT No.: PCT/DK2018/050219
§ 371 (c)(1),
(2) Date: Feb. 20, 2020

(87) PCT Pub. No.: WO2019/042516
PCT Pub. Date: Mar. 7, 2019

(65) Prior Publication Data
US 2020/0355166 A1  Nov. 12, 2020

(30) Foreign Application Priority Data

Sep. 4, 2017 (DK) .......................... PA 2017 70661

(51) Int. Cl.
*F16F 7/10* (2006.01)
*E04B 1/98* (2006.01)
(Continued)

(52) U.S. Cl.
CPC .............. *F03D 80/80* (2016.05); *E04B 1/98* (2013.01); *F16F 7/10* (2013.01); *F16F 13/06* (2013.01);
(Continued)

(58) Field of Classification Search
CPC .. F16F 7/10; F16F 7/104; F16F 15/022; F16F 15/023; F16F 15/0235; F16F 2222/12;
(Continued)

(56) References Cited

U.S. PATENT DOCUMENTS 3,026,224 A * 3/1962 Rogers, Jr. .............. F16F 1/376
428/167
3,382,629 A    5/1968 Reutlinger
(Continued)

FOREIGN PATENT DOCUMENTS

CN         105308315 A    2/2016
DE         3627338 C2 *   5/1991 ............. E04H 12/28
(Continued)

OTHER PUBLICATIONS

Danish Patent and Trademark Office, Search and Examination Report in PA 2017 7061, dated Mar. 7, 2018.
(Continued)

*Primary Examiner* — Thomas J Williams
(74) *Attorney, Agent, or Firm* — Wood Herron & Evans LLP

(57) ABSTRACT

The present invention relates to a wind turbine tower comprising a tower vibration damper (100) with a tuned mass damper and one or more impact damping units (113, 114, 115, 200, 300, 400). The tuned mass damper comprises a pendulum structure (101, 208), a chamber connecting a friction media (112) to the pendulum structure (101, 208) is at least partly immersed, and a suspension arrangement (103-111) suspending the pendulum structure (101, 208) inside the wind turbine tower such that the pendulum structure (101) is allowed to displace from a neutral position towards the outer boundary (102) of the chamber. The impact damping units (113, 114, 115, 200, 300, 400) are positioned between the pendulum structure (101, 208) and
(Continued)

the outer boundary (102), such that the outer boundary (102) of the chamber and the pendulum structure (101, 208) may collide via the impact damping units (113, 114, 115, 200, 300, 400).

14 Claims, 7 Drawing Sheets

(51) Int. Cl.
  *F16F 15/02* (2006.01)
  *F03D 80/80* (2016.01)
  *F16F 13/06* (2006.01)
(52) U.S. Cl.
  CPC ...... *F16F 15/022* (2013.01); *F05B 2220/705* (2020.08); *F05B 2240/912* (2013.01); *F05B 2240/917* (2013.01); *F05B 2260/964* (2013.01); *F16F 2222/04* (2013.01); *F16F 2222/08* (2013.01); *F16F 2222/12* (2013.01); *F16F 2228/007* (2013.01)
(58) Field of Classification Search
  CPC ............... F16F 2222/08; F16F 2232/02; F05B 2230/964; F05B 2260/964; E04B 1/98
  See application file for complete search history.

(56) References Cited

U.S. PATENT DOCUMENTS

| | | | | |
|---|---|---|---|---|
| 3,582,018 | A * | 6/1971 | Tirabassi | F16F 15/023 244/1 R |
| 3,588,001 | A * | 6/1971 | Mitchell | G01C 17/28 244/1 R |
| 7,928,593 | B2 * | 4/2011 | Ollgaard | F03D 80/00 290/44 |
| 2011/0056151 | A1 | 3/2011 | Marmo et al. | |
| 2016/0215754 | A1 | 7/2016 | Seidel | |
| 2016/0252079 | A1 | 9/2016 | Ollgaard et al. | |
| 2018/0017125 | A1 * | 1/2018 | Amdisen | F16F 7/10 |

FOREIGN PATENT DOCUMENTS

| | | | | |
|---|---|---|---|---|
| DE | 10302687 | A1 * | 7/2004 | ............ F16F 7/10 |
| DE | 10302687 | A1 | 7/2004 | |
| DK | 1008747 | T3 | 10/2008 | |
| EP | 1008747 | A2 * | 6/2000 | ............ F03D 13/20 |
| FR | 2607209 | A1 * | 5/1988 | ............ F16F 15/023 |
| JP | H08270724 | A | 10/1996 | |
| WO | WO-9839392 | A1 * | 9/1998 | ............ C09D 5/22 |
| WO | WO-0153633 | A1 * | 7/2001 | ............ H01Q 1/1242 |
| WO | WO-2009027663 | A2 * | 3/2009 | ............ E02D 27/42 |

OTHER PUBLICATIONS

European Patent Office, International Search Report and Written Opinion in PCT Application No. PCT/DK2018/050219, dated Nov. 26, 2018.

China National Intellectual Property Administration, First Notification of Office Action in CN Application No. 201880057038.9, dated Oct. 28, 2020.

* cited by examiner a)

b)

TOWER VIBRATION DAMPER

FIELD OF THE INVENTION

The present invention relates to a wind turbine tower with a tower vibration damper. The vibration damper is mounted in the wind turbine tower in order to reduce vortex induced vibrations during assembly, storage, transport, installation and/or operation of such wind turbine towers.

BACKGROUND OF THE INVENTION

Damping of vortex induced vibrations within for example the wind turbine industry has become more important over the recent years as the height of modern wind turbine generators becomes higher and higher.

Generally, vortex induced vibrations may be damped by either changing the shape of the structure being exposed to the wind, or changing the vibrational properties of the structure being exposed to the wind. Changing the shape of the structure may involve that for example spoilers are secured to the outer surfaces of the structure, while changing the vibrational properties of the structure may involve that the natural frequency of the structure is changed, or a vibration damper is added to the structure. The vibration damper is typically placed close to the free end of the structure, i.e. the top.

It is obviously critical to deal with vibrations in general during operation of wind turbine generators. It is however also critical to deal with in particular vortex induced vibrations during assembly, storage, transport, installation and/or operation of wind turbine towers as the towers otherwise may be damaged due to uncontrolled vibrations, much stronger structure for securing the tower to the support may be needed and/or safety of personnel working in or near the tower may be compromised.

It may be seen as an object of embodiments of the present invention to provide a simple and robust tower vibration damper that can provide damping of the wind turbine towers during assembly, storage, transport and/or installation as well as after the wind turbine has been assembled, i.e. during operation of the wind turbine generator.

DESCRIPTION OF THE INVENTION

The above-mentioned object is complied with by providing, in a first aspect, a wind turbine tower comprising a tower vibration damper, the tower vibration damper comprising
  a tuned mass damper comprising:
  a pendulum structure suspended inside the wind turbine tower,
  a chamber comprising an outer boundary the chamber connecting a friction media to the pendulum structure, and
  a suspension arrangement, suspending the pendulum structure inside the wind turbine tower such that the pendulum structure is allowed to displace from a neutral position towards the outer boundary of the chamber,
  and an impact damper comprising:
  one or more impact damping units positioned between the pendulum structure and the outer boundary of the chamber, such that the outer boundary of the chamber and the pendulum structure may collide via the impact damper.

Thus, the vibration damper of the present invention comprises a tuned mass damper configured to be active during operation of the wind turbine generator, and an impact damper configured to be active during assembly, storage, transport and/or installation of the wind turbine tower in order to reduce in particular vortex induced vibrations. A tuned mass damper, also known as a harmonic absorber or seismic damper, is a device mounted in structures to reduce the amplitude of mechanical vibrations. Tuned mass dampers stabilize against violent motion caused by harmonic vibration. A tuned damper reduces the vibration of a system with a comparatively lightweight component so that the worst-case vibrations are less intense. When working as a tuned mass damper, the vibration damping effect of a pendulum is based tuned mass damper results from the oscillation of the damper only with no mechanical impact between pendulum and the outer boundary of the chamber for absorbing vibrational energy. For the tuned mass damper to work optimum, the damper should be tuned carefully to the natural frequency of the structure. The natural frequency of the installed wind turbine generator is constant and may be determined by standard methods known in the art, where after tuned mass damper can be tuned to this frequency. However, during assembly, storage, transportation and installation, the natural frequency of the tower changes dependent on the stage of assembly (i.e. size, weight, weight distribution and aerodynamic structure), the type of fastening to supporting structure and the characteristics of the support (e.g. a rolling ship versus a monopile or on-ground storage). The efficiency of the tuned mass damper therefore may be lower than required for safe working in the tower or changes to fastening may be required or the tuned mass damper may require tuning after each movement which is not practical.

The impact damper, on the other hand, does rely on mechanical impact for the absorption of vibrational energy, whereby the vortex induced vibration is reduce or even removed. The effect of the impact may partially or fully be due to the effective mass and hence the natural frequency of the tower structure changing during the impact between the pendulum structure and the chamber via the impact damper whereby the vortex induced vibration is broken down. By being positioned between the pendulum structure and the outer boundary of the chamber, it absorbs the kinetic energy of the pendulum structure when it hits the chamber wall (via the impact damper). Preferably, the impact damper is only 'activated' during assembly, storage, transport and/or installation of the wind turbine tower when different natural frequencies, different oscillation modes and/or large vibration amplitudes may be present than during normal operation of the wind turbine generator after installation.

It is noted that, in relation to the impact damper, the term 'activated' refers to a configuration of the vibration damper in which the impact damper is capable of performing its damping function. The damping function itself may, and in most embodiments will, be realised in a passive and fully mechanical way. When activated, the impact damper is positioned in between the pendulum structure and the chamber wall in such a way that a particular vibrational amplitude of the wind turbine tower causes the pendulum structure to collide with the chamber wall via the impact damper. When deactivated, the same amount of wind turbine vibration will not cause such collision, neither directly nor via the impact means.

Deactivating or dismantling the impact damper may, for example, be realised by removing or relocating the impact damper, changing its shape and/or dimensions or by rotating the pendulum structure relative to the chamber wall.

The tower vibration damper of the present invention is advantageous due to its simple and robust design. Moreover, the impact damper is advantageous in that it may be dismantled and reused in another wind turbine tower when the wind turbine generator is fully assembled. Therefore, in preferred embodiments, the impact damper is adapted to be deactivated in order to prevent collision of the outer boundary and the pendulum structure via the impact damper. Deactivation may, e.g., be realised by removing or relocating the at least one impact damper units, changing the shape and/or dimensions of at least one of the impact damper units (e.g. by deflating), or by rotating the pendulum structure relative to the outer boundary of the chamber. It has been observed that not deactivating/dismantling the impact damper may have a negative influence on the damping characteristics of the tuned mass damper. In the event that the impact damper is not intended to be (fully) removed after the tower installation, the pendulum structure may be configured to have the desired damping characteristics when the impact units are still (partly) installed. This desired damping characteristics after the tower installation is preferably different from the damping characteristics during tower installation.

As used herein, the term tower also encompasses tower section and partially assembled towers as well as fully assembled wind turbine generators including tower.

The friction media is part of the elements acting as a tuned mass damper. Examples of friction media are a friction element between a bottom part of the chamber and the pendulum; a magnetic, mechanical or fluid (such as a liquid) based damper or absorber arranged between the pendulum and a wall of the chamber. Most preferred is that the friction media is a damping liquid held in the chamber where the chamber has a bottom part extending between wall parts of the outer boundary into which the pendulum structure is at least partly immersed. The chamber is connecting the friction media to the pendulum structure. For a damping liquid, this is done by the chamber holding the damping liquid, so the pendulum can move forward and back in the damping liquid. For a magnetic, mechanical or fluid based damper or absorber the chamber may for example be connecting the friction media to the pendulum by one end of the friction media being connected to the wall of the chamber and another end of the friction media being connected to the pendulum.

In one embodiment the pendulum structure may comprise a cylindrically shaped pendulum body, and the one or more impact damping units may be positioned between an outer surface of the cylindrically shaped pendulum body and an inner surface of the outer boundary of the chamber. The outer boundary of the chamber may be formed by a wind turbine tower wall or by a panel or wall that is fixed to the main wind turbine tower structure. Alternatively, the pendulum structure may be a polygonal.

In a further embodiment the one or more impact damping units may be detachably secured to the pendulum structure. The one or more impact damping units may thus be removed when the wind turbine generator is fully assembled. Particularly, the one or more impact damping units may be detachably suspended from an upper rim of the pendulum structure.

The number of impact damping units may be chosen to fulfil certain demands. Thus, the number of impact damping units may be larger than 2, such as larger than 3, such as larger than 4, such as larger than 6, such as larger than 8.

Moreover, the impact damping units may be evenly distributed around a centre axis of the pendulum structure or around a centre axis of the wind turbine tower. The number of impact damping units (113, 114, 115, 200, 300, 400) may be at most 16, such as at most 9.

Each impact damping unit may comprise one or more resilient fenders each having a durometer hardness of at least Shore 50A, such as Shore 60A, such as Shore 70A, such as Shore 80A. Each fender may have a durometer hardness of at most Shore 85A, such as at most Shore 80A. The one or more resilient fenders may be implemented as solid structures or hollow structures, such as inflatable structures. In an embodiment each impact damping unit may comprise oppositely arranged first and second resilient fenders, wherein the first resilient fender faces the pendulum structure, and wherein the second resilient fender faces the outer boundary of the chamber. The first and second resilient fenders may be secured to a common base structure of the impact damping unit.

In a further embodiment the impact damping units may be implemented as inflatable structures secured to or suspended from the outer boundary of the chamber. Examples of such inflatable structures may include but are not limited to air bellows balls and tires. In this embodiment the impact damping units may be permanently installed and inflated to activate and deflated to deactivate.

In yet another embodiment the impact damping units may be attached to the wind tower wall forming a plurality of inwardly oriented protrusions. In this embodiment the tuned mass damper may be configured with a shape that allows for adjustment of the distance to the impact damping units as the tuned mass damper is rotated about a longitudinal axis of the wind tower. For example, the pendulum may be regular or irregular polygonal. When the corners of the polygonal pendulum is aligned with the impact damping units attached to the wind tower wall the distance is at its minimum and the impact damping units are thus active. When the pendulum is rotated about the longitudinal axis of the tower, and the corners of the polygonal pendulum are no longer aligned with the impact damping units, the distance increases and the impact damping units become inactive.

The chamber holding the damping liquid into which the pendulum structure is at least partly immersed may comprise an outer boundary with a bottom part extending between wall parts of the outer boundary and, wherein the outer boundary of the chamber may be formed by a part of the wind turbine tower wall.

The suspension arrangement for suspending the pendulum structure inside the wind turbine tower may comprise
- a plurality of wires for suspending the pendulum structure, and
- tuning means configured for adjusting the natural frequency of the suspended pendulum structure, the tuning means comprising, for each of said plurality of wires, a clamp secured to the wind turbine tower at one end and to the wire at the other end, wherein the securing of the clamp is configured such that the clamp is movable along a longitudinal direction of the wire.

A simple version of the suspension arrangement may comprise only a single wire and means to secure the wire to the wind turbine tower, such as a clap.

The tower vibration damper of the present invention may be installed at a position as high as possible inside a vertical wind turbine tower. Typically, an installation of the tower vibration damper within the upper ⅓ of a vertical wind turbine tower may provide effective damping of tower vibrations.

In a second aspect, the present invention relates to a method of damping tower vibrations of a wind turbine tower, the method comprising the steps of providing a tuned mass damper comprising:
- a pendulum structure suspended inside the wind turbine tower,
- a chamber comprising an outer boundary and a bottom part extending under the outer boundary, the chamber holding a damping liquid into which the pendulum structure is at least partly immersed, and
- a suspension arrangement for suspending the pendulum structure inside the wind turbine tower such that the pendulum structure is allowed to displace from a neutral position towards the outer boundary of the chamber, and during assembly, storage, transport and/or installation of the wind turbine tower, providing an impact damper comprising:
- one or more impact damping units positioned between the pendulum structure and the outer boundary of the chamber, such that the outer boundary of the chamber and the pendulum structure may collide via the impact damper.

In case of a detachable impact damper the method of the present invention may further comprise the step of dismantling the impact damper when the wind turbine tower is no longer during assembly, storage, transport and/or installation.

In a further aspect, the present invention relates to a use of a tuned mass damper as an impact damper by providing impact damping units (113,114,115,200,300,400) between the pendulum structure (101, 208) and an outer boundary (102) of a chamber where the pendulum structure (101, 208) is arranged.

BRIEF DESCRIPTION OF THE DRAWINGS

The present invention will now be described in further details with reference to the accompanying figures, wherein.

Figure 1:
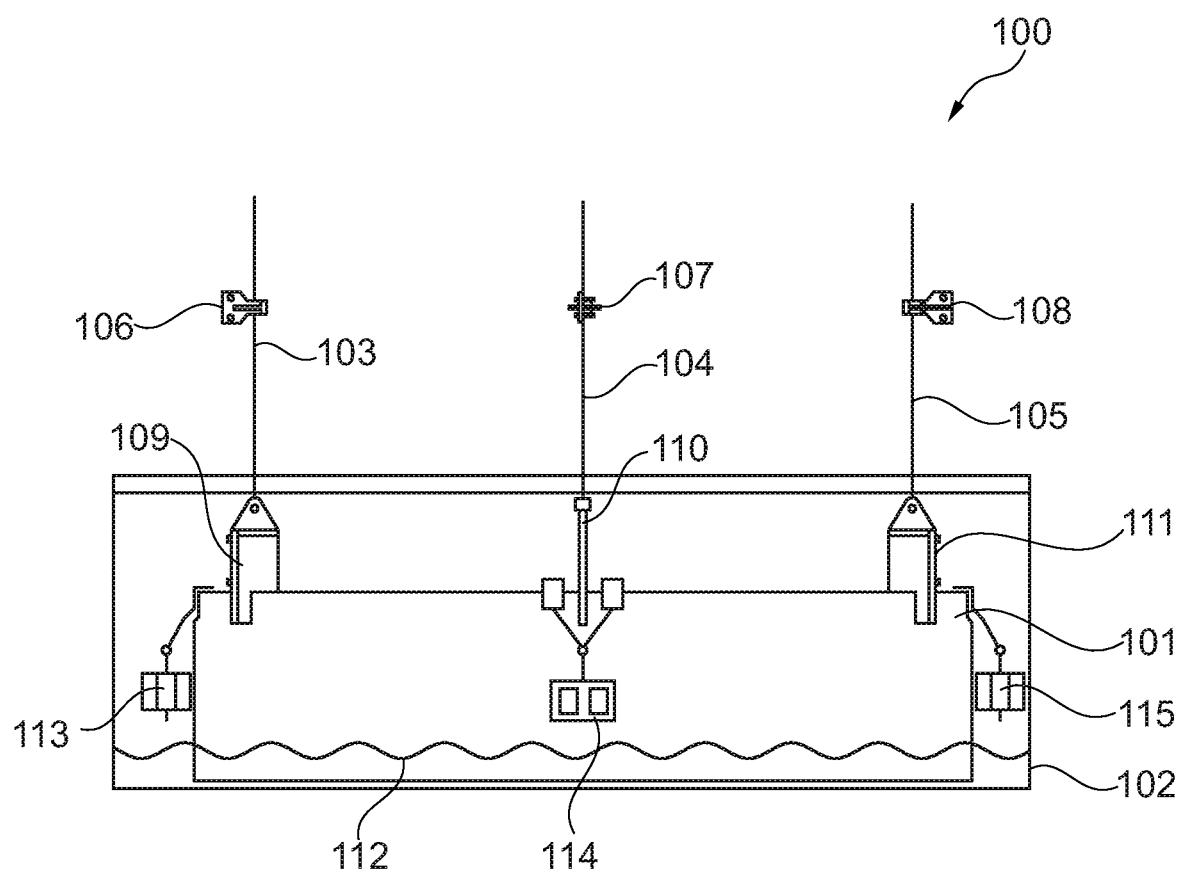
FIG. 1 shows a cross-sectional view of the tower vibration damper of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a tower vibration damper comprising a tuned mass damper and one or more impact damping units configured for transferring displacements of the tower structure through impact between the impact damping units and a tower wall and/or a tuned mass damper. The tower vibration damper with the impact damping units of the present invention is particular suitable for damping vortex induced vibrations during assembly, storage, transport, installation and/or operation of wind turbine towers. The overall response of the tower vibration damper at low wind speeds follows a tuned mass damper behaviour, whereas the overall response at higher wind speeds follows a combined tuned mass damper and impact damper behaviour as a result of shifted resonance frequencies. At high wind speeds the overall response of the tower vibration damper follows a regular 1-degrees-of-freedom (DOF) response for combined masses.

As vortex induced vibrations are most pronounced before the nacelle is installed, at least the one or more impact damping units of the tower vibration damper of the present invention may be temporarily installed and operated in wind turbine towers during assembly, storage, transport and/or installation thereof. The one or more impact damping units may then be dismantled after the entire wind turbine generator has been assembled and reused in another tower. The tuned mass damper maintains its operation after the wind turbine generator has been assembled, but without the impact damping units because the frequency characteristics of the wind tower changes when the nacelle and rotor are installed.

In an embodiment of the invention the impact damping units are composed of an inflatable structure (not shown). Examples of such an inflatable structure include but are not limited to air bellows balls and tires. In this embodiment the impact damping units may be permanently installed and inflated to activate and deflated to deactivate. The impact damping structure can be suspended from the wind tower wall or from the tuned mass damper.

In a further embodiment of the invention the impact damping units are attached to the wind tower wall as a plurality of protrusions (not shown). The tuned mass damper is configured with a shape that allows for adjustment of the distance to the impact damping units as the tuned mass damper is rotated about the longitudinal axis of the wind tower. For example, the pendulum could be polygonal. When the corners of the polygonal pendulum are aligned with the impact damping units attached to the wind tower wall the distance is at its minimum and the impact damping units are thus active. When the pendulum is rotated about the longitudinal axis of the tower the distance increases and the impact damping units become inactive.

Referring now to FIG. 1 a side view of an embodiment 100 of the present invention is depicted. FIG. 1 shows a cylindrically shaped pendulum structure 101 being suspended in three wires 103, 104, 105. The weight of the pendulum structure is determined based on the generalized mass of the tower. The length of the wires 103, 104, 105 sets the natural frequency of the vibration damper. Thus, by varying the length of the wires 103, 104, 105 the natural frequency of the cylindrically shaped pendulum structure may be altered and thereby tailored to specific demands.

In the present application the term "length of the wires" relates to the length of the wires that are free to swing, i.e. the distance between the suspension point where the wire is attached to the tower structure or an intermediate fixation point and the pendulum structure. Common for a suspension point and a fixation point is that the wire is fixed at least in relation to lateral displacements. The wire may move angularly below the suspension point or fixation point allowing the pendulum structure to swing.

In the embodiment depicted in FIG. 1 the length of the wires 103, 104, 105 may be altered by moving the respective wire fixations arrangements 106, 107, 108 up and down, i.e. along the longitudinal direction of the wires 103, 104, 105. The natural frequency of the pendulum structure is tuned by adjusting the length of the wires 103, 104, 105 and tuned to be lower that the natural frequency of the wind turbine tower. The three wires 103, 104, 105 are attached to the pendulum structure via brackets 109, 110, 111, respectively.

As depicted in FIG. 1 the pendulum structure 101 is at least partly positioned in a chamber or bath containing a damping liquid 112. The pendulum structure 101 is at least partly immersed into this damping liquid 112 in order to damp sidewalls movements of the pendulum structure.

The suspended pendulum structure 101, the wires 103, 104, 105 including the wire fixations arrangements 106, 107, 108 as well as the chamber or bath containing a damping liquid 112 are permanently installed in the wind turbine tower and should thus also be used for damping purposes during normal operation of the wind turbine.

As indicated in FIG. 1 the impact damping units 113, 114, 115, of which three are visible in FIG. 1, are detachably secured to the pendulum structure 101. The impact damping units 113, 114, 115 are, as seen in FIG. 1, positioned between the pendulum structure 101 and a wind turbine tower wall 102. The tower vibration damper thus comprises a tuned mass damper in the form of the pendulum structure 101 and a number of impact damping units 113, 114, 115. The number of impact damping units may be selected to fulfil certain requirements. Also, the angular distribution of the impact damping units may be chosen to fulfil such requirements. A possible implementation of an impact damping unit is disclosed in relation to FIGS. 2-5.

The tower vibration damper of the present invention may be operated in the following three modes of operation:
1) Non-colliding mode of operation (small forces on tower)
2) Collision-limited mode of operation (medium forces on tower)
3) Overwhelmed mode of operation (strong forces on tower)

In the non-colliding mode of operation, the displacements of the wind turbine tower wall 102 are too small to engage the impact damping units 113, 114, 115 leading to a regular 2-DOF response of the wind turbine tower. In the collision-limited mode of operation the impact damping units 113, 114, 115 momentarily engage with the wind turbine tower wall 102 which effectively limits the wind turbine tower response. In the overwhelmed mode of operation, the pendulum structure 101 essentially follows the displacements of the wind turbine tower leading to a regular 1-DOF response of the wind turbine tower. The principle of operation will be disclosed in further details in connection with FIG. 7.

The tower vibration damper of the present invention is adapted to be installed at a position as high as possible inside a vertical wind turbine tower. Typically, an installation of the tower vibration damper within the upper ⅓ of a vertical wind turbine tower will provide effective damping of tower vibrations.

Figure 2:
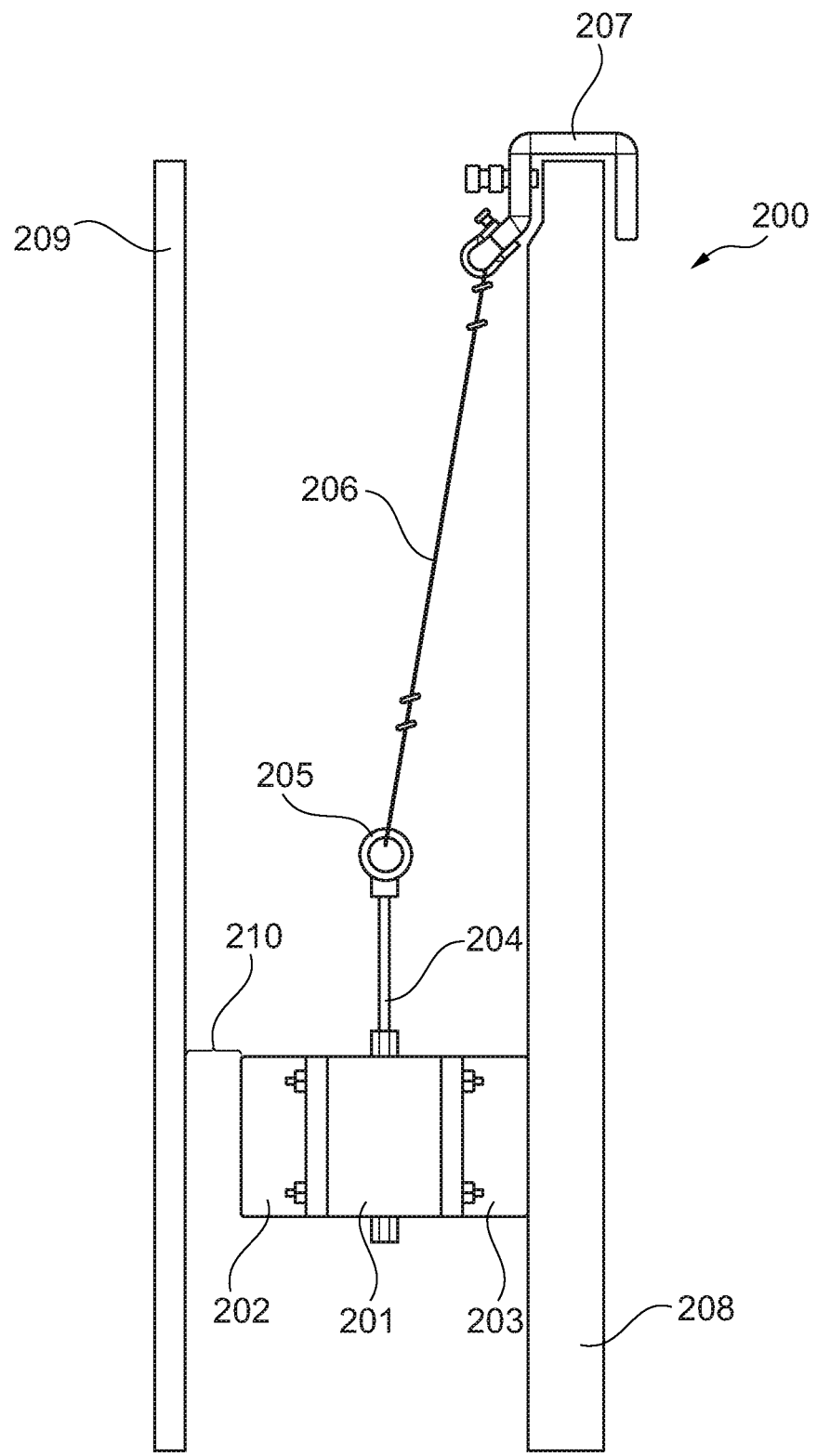
FIG. 2 shows a cross-sectional view of an impact damping unit positioned between a pendulum structure and a wind turbine tower wall in order to transfer tower wall displacement to the pendulum structure.

Turning now to FIG. 2 an example of an impact damping unit 200 detachably secured to a pendulum structure 208 is depicted. As seen in FIG. 2 the impact damping unit 200 is positioned between the pendulum structure 208 and the wind turbine tower wall 209, forming part of the outer boundary of the chamber. The impact damping unit 200 comprises a base element 201 having two oppositely arranged resilient fenders 202, 203 secured thereto. The base element 201 may be made of metal, whereas the resilient fenders 202, 203 are made of a softer material having a durometer hardness of 30 to 100 or at least Shore 50A, such as Shore 60A, such as Shore 70A, such as Shore 80A. Each fender may have a durometer hardness of at most Shore 85A, such as at most Shore 80A. A threaded rod 204 is secured to the base element 201 using an appropriate number of nuts. An eye structure 205 is secured to the threaded rod 204 which allows that the impact damping unit 200 may be suspended in a wire 206 having an adjusted length in order to adapt to the height of the pendulum structure 208. A bracket 207 is detachably secured to the pendulum structure 208 and the wire 206 is secured to the bracket 207 via a shackle.

An opening 210 of typically a few centimetres is allowed between the resilient fender 202 and the wind turbine tower wall 209 when the pendulum is in neutral position. Thus, by installing the impact damping unit 200 as depicted in FIG. 2 the displacement capabilities of the pendulum structure 208 is significantly reduced. The size of the opening 210 may be tailored to specific demands, i.e. it may be tailored at which vibration level the wind turbine tower wall 209 should collide with the resilient fender 202.

At small displacements of the wind turbine tower wall 209, i.e. in the non-colliding mode of operation, the tower wall 209 will not engage with the resilient fender 202 of the impact damping unit 200. At larger displacements of the tower wall 209, i.e. in the collision-limited mode of operation, the tower wall 209 will momentarily engage with the resilient fender 202 of the impact damping unit 200. At even larger displacements of the tower wall 209, i.e. in the overwhelmed mode of operation, the pendulum structure 208 essentially follows the displacements of the wind turbine tower wall 209. The opening 210 should ideally be dimensioned in a manner so that entry into the overwhelmed mode of operation during assembly, storage, transport and/or installation thereof is avoided. As previously addressed the one or more impact damping units 200 may be dismantled after the entire wind turbine generator has been assembled and reused in another wind turbine tower.

In general, it should be noted that the impact damping unit 200 shown in FIG. 2 can be detachably secured in a different manner as depicted in FIG. 2. For example, the impact damping unit 200 may be secured to the wind turbine tower wall 209 instead of being secured to the pendulum structure 208.

Figure 3:
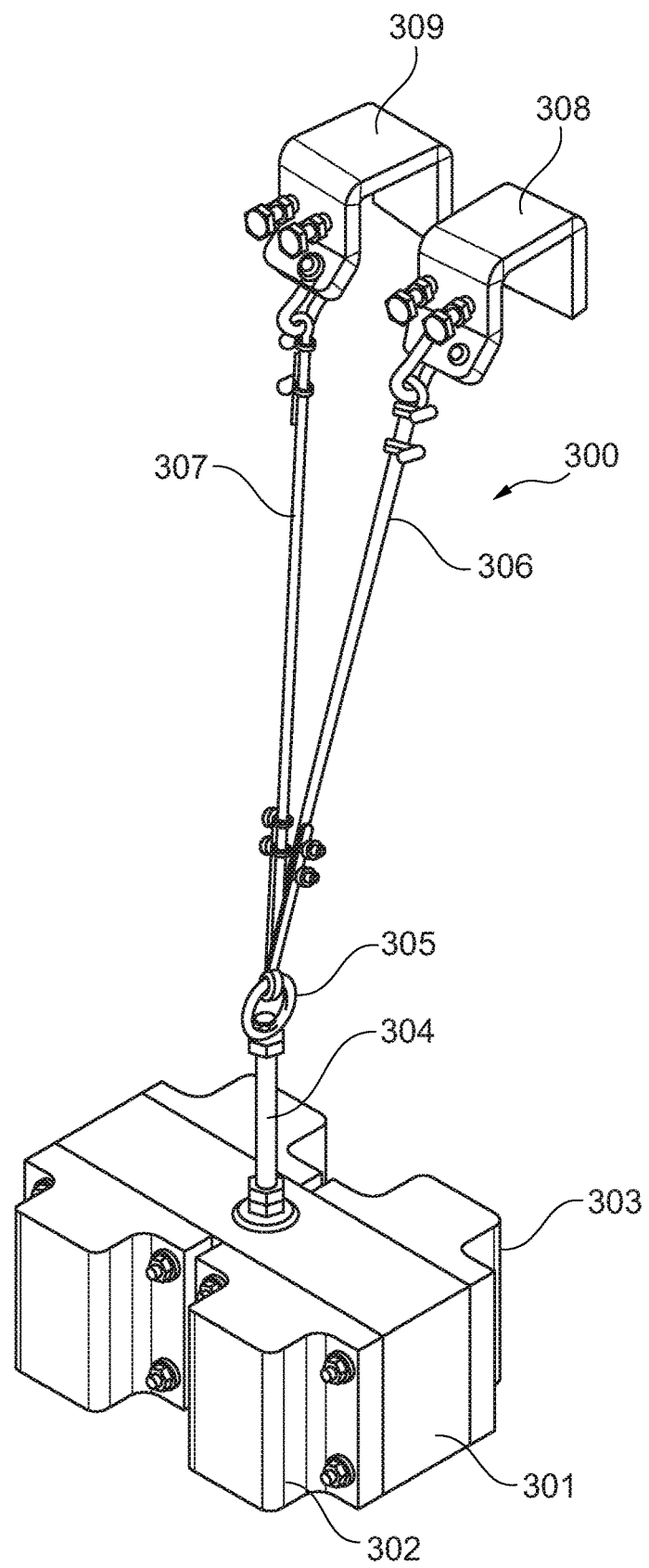
FIG. 3 shows a 3D perspective of an impact damping unit.

In FIG. 3 an impact damping unit 300 is depicted in a 3-D perspective. As seen in FIG. 3 the impact damping unit 300 comprises a base element 301 and two oppositely arranged (sets of) resilient fenders 302, 303 secured thereto. Resilient fender 302 is adapted to engage with the wind turbine tower, whereas resilient fender 303 is adapted to engage with the pendulum structure. A threaded rod 304 is secured to the base element 301 in one end, and to an eye structure 305 in the other end. Two wires 306, 307 with adjustable lengths are provided for suspending the impact damping unit 300 in respective brackets 308, 309 which are adapted to be detachably secured to an upper rim of the pendulum structure (not shown). As mentioned above the resilient fenders 302, 303 may be made of a material having a durometer hardness of at least Shore 50A, such as Shore 60A, such as Shore 70A, such as Shore 80A. Each fender may have a durometer hardness of at most Shore 85A, such as at most Shore 80A.

Figure 4:
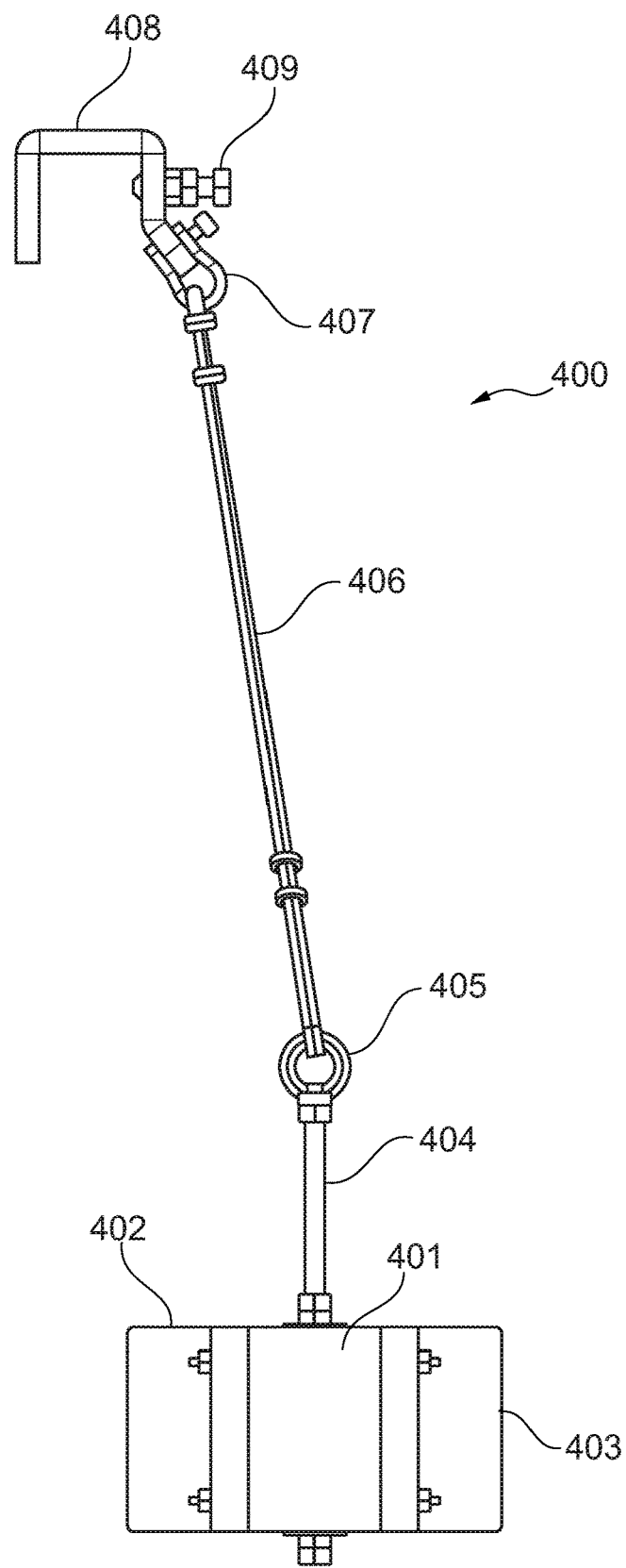
FIG. 4 shows a cross-sectional view of an impact damping unit.
Figure 5:
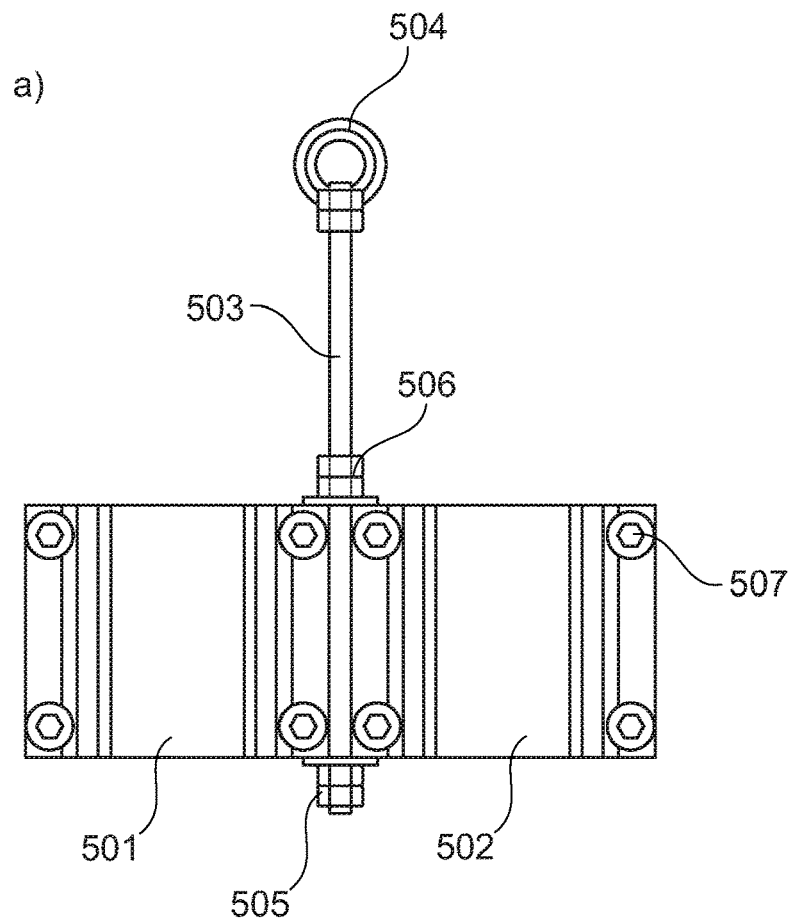
FIG. 5 shows side and top views an impact damping unit.
Figure 5:
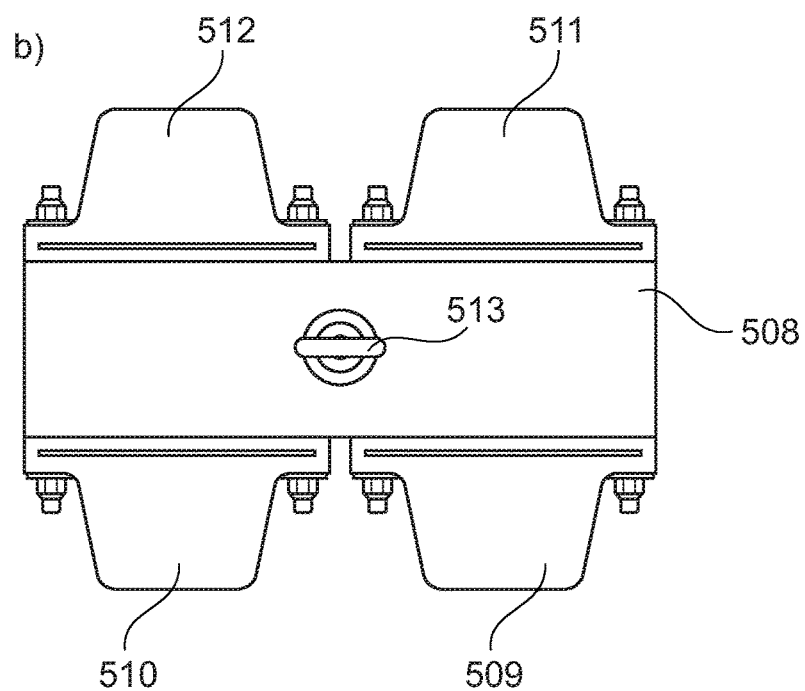

FIG. 4 shows a side view perspective of an impact damping unit 400. As previously addressed the impact damping unit 400 comprises a base element 401 and two oppositely arranged resilient fenders 402, 403 secured thereto. Resilient fender 403 is adapted to engage with the wind turbine tower, whereas resilient fender 402 is adapted to engage with the pendulum structure. A threaded rod 404 is secured to the base element 401 in one end, and to an eye structure 405 in the other end. Again, two adjustable wires 406 (one is hidden) are provided for suspending the impact damping unit 400 in respective brackets 408 (one hidden) which are adapted to be detachably secured to an upper rim of the pendulum structure (not shown) via screws 409. The wires 406 are secured to the brackets 408 via respective shackles 407.

FIGS. 5a and 5b show more detailed perspectives of an impact damping unit. Referring now to the front view perspective shown in FIG. 5a two resilient fender portions 501, 502 are secured to a base element (not shown) via bolts/nuts 507. Again, a threaded rod 503 is secured to the base element (not shown) via nuts 505, 506. An eye structure 504 is secured to the threaded rod 503 so that the impact damping unit may be suspended in an adjustable wire (not shown) via said eye structure 504. In the top view perspective shown in FIG. 5b the impact damping unit comprises opposing pairs of resilient fenders 509, 510 and 511, 512 all being secured to the base element 508 via through-going bolts. The eye structure 513 for suspending the impact damping unit is also depicted.

Figure 6:
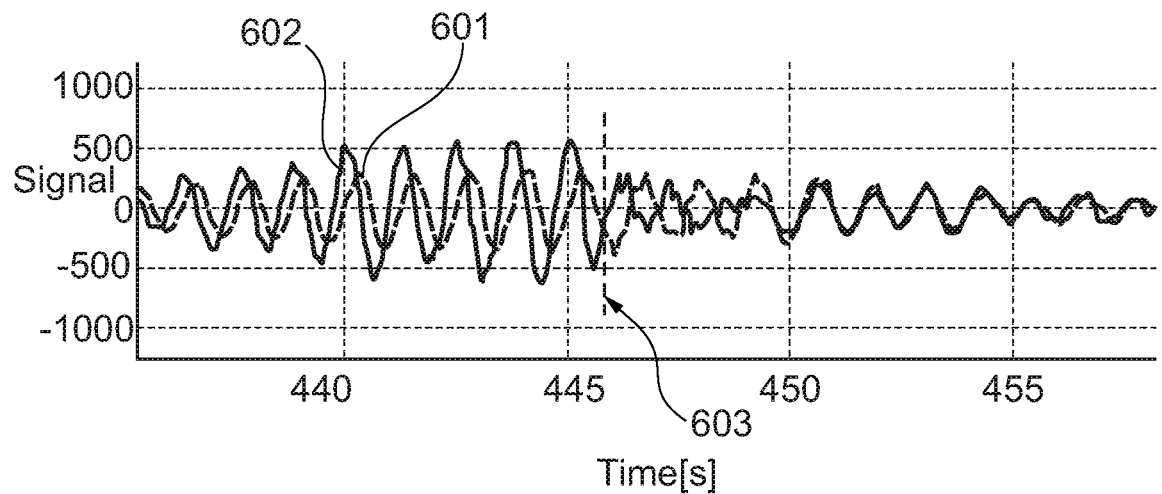
FIG. 6 shows reduced wind tower vibrations as a result of impact damping units.
Figure 6:
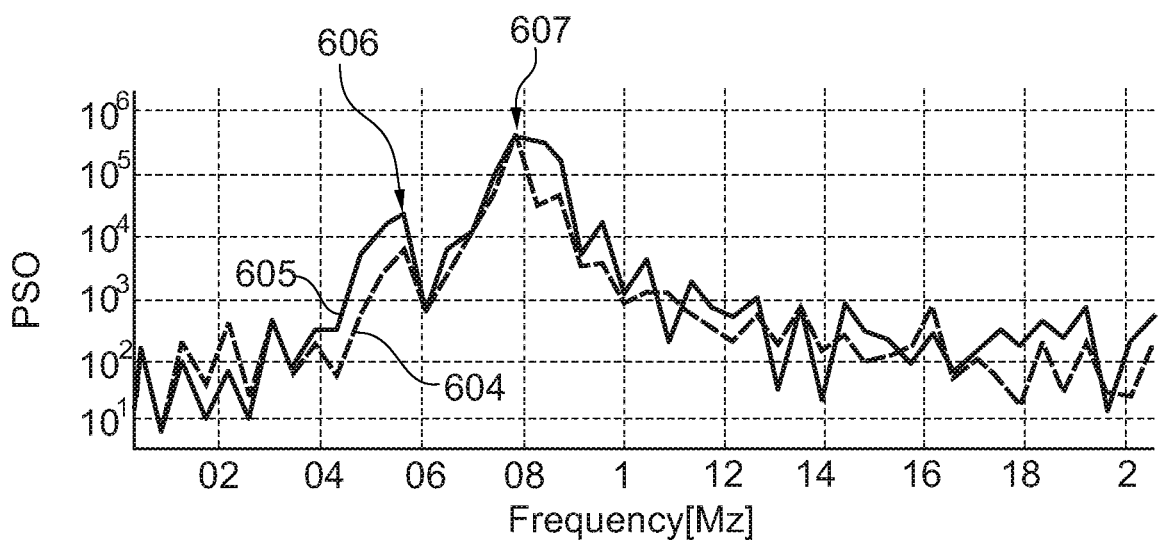

The effect of the tower vibration damper of the present invention is demonstrated in FIG. 6. The time development of two acceleration signals 601, 602 are shown in the upper graph. The two acceleration signals 601, 602 originate from two accelerometers mounted in a wind turbine tower being exposed to a constant wind speed which is capable of inducing vortex vibrations. As the axes of the two accelerometers are slightly angled the two acceleration signals 601, 602 are slightly different too. In order to damp vortex induced vibrations a suspended pendulum structure as well as four evenly distributed impact damping units are arranged in the wind turbine tower. As seen from the two curves 601, 602 in the upper graph of FIG. 6 the acceleration of the wind turbine tower increases until the time reaches approximately 446 seconds. At this point, marked with arrow 603, the impact damping units momentarily engage with the wind turbine tower wall whereby the overall system response changes from a regular tuned mass damper to a combined response involving both a tuned mass damper and an impact damper. This change of response has its origin in a change or shift of natural frequencies of the system. It is clear from the upper graph of FIG. 6 that the accelerations, and thereby the displacements of the wind turbine tower top, die out as a result of the engagement of the impact damping units with the wind turbine tower.

In the lower graph of FIG. 6 two measured frequency spectra 604, 605 are shown. The frequency spectra 604, 605 are derived from the acceleration signals 601, 602, respectively. Two rounded or smoothed resonance peaks 606, 607 are present in each of the spectra 604, 605. The peak 606 originates from the tuned natural frequency of the pendulum structure, whereas the peak 607 originates from the natural frequency of the wind turbine tower. The rounded or smoothed shapes of the peaks are caused by the fact that the system is in the collision-limited mode of operation where the impact damping units momentarily engage with the wind turbine tower wall which effectively reduces the wind turbine tower response.

Figure 7:
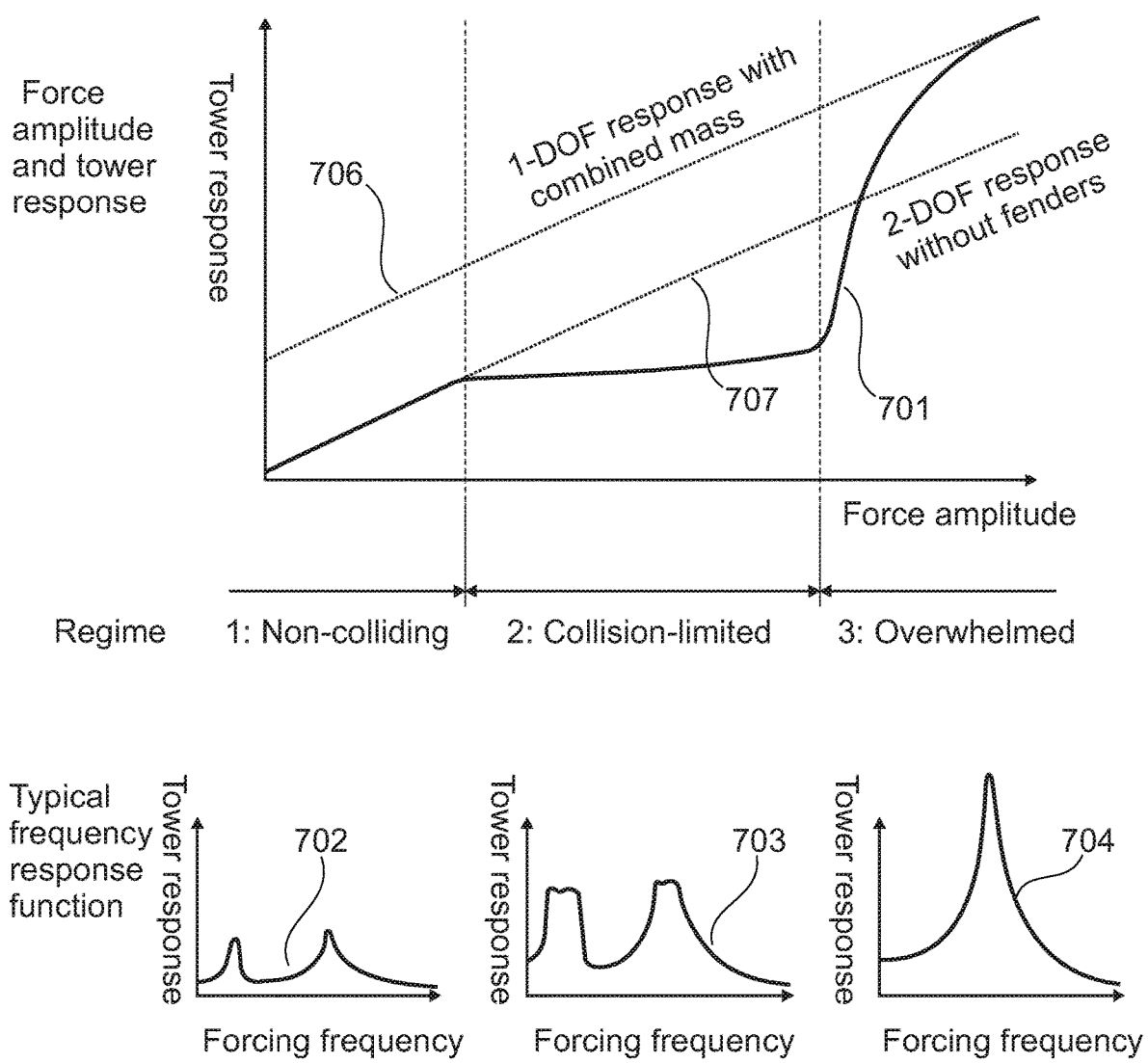
FIG. 7 shows various modes of operation.

FIG. 7 illustrates the underlying principle of the tower vibration damper of the present invention. As previously addressed the tower vibration damper may be considered having a tuned mass damper and an impact damper. In the non-colliding mode of operation, the displacements of the wind turbine tower wall are too small to activate and thereby engage the impact damper leading to a regular 2-DOF response of the wind turbine tower, cf. the tower response curve 702 in FIG. 7 where the tower response at the natural frequencies of the pendulum structure and the wind turbine tower are pronounced. In the collision-limited mode of operation the impact damper momentarily engages with the wind turbine tower wall which effectively damps the wind turbine tower response, cf. the tower response curve 703 in FIG. 7 where the tower response at the natural frequencies of the pendulum structure and the wind turbine tower are less pronounced due to damping. In the overwhelmed mode of operation, the pendulum structure essentially follows the displacements of the wind turbine tower leading to a regular 1-DOF response of the wind turbine tower, cf. the tower response curve 704 in FIG. 7 where the tower response at the resulting/combined natural frequency of the pendulum structure and the wind turbine tower is highly pronounced. The overwhelmed mode should therefore be avoided as the positive effect of the impact damper is reduced, and at the situation most to the right of top FIG. 7 the impact damper will not be have any influence on the vibration of the tower.

In the upper graph of FIG. 7 the tower response vs. force amplitude is depicted in the non-colliding, collision-limited and the overwhelmed mode of operations. The upper dotted line 706 illustrates a theoretical 1-DOF tower response in case of an overwhelmed mode of operation, i.e. in the scenario where the pendulum structure essentially follows the displacements of the wind turbine tower. The lower dotted line 707 illustrates a theoretical 2-DOF tower response in case no impact damper is active. The slope of the tower response curve 707 is given by the mass of the pendulum structure and the length of the wires suspending it.

The solid line 701 illustrates the response of the tower vibration damper of the present invention. As seen, the solid line 701 follows the 2-DOF tower response 707 in the non-colliding regime. In the collision-limited regime the tower response is significantly damped compared to the 2-DOF tower response 707, whereas in the overwhelmed regime the tower response takes off and approaches the 1-DOF tower response 706 as expected. It is therefore observed that in the collision limited regime, the impact damper according to the invention is able to keep the tower response to about the level of the non-colliding regime when the force amplitude is increased into the regime which leads to collision between the pendulum structure and the chamber outer boundary via the impact damper despite much higher force amplitude. In practice, this means that it is possible to work in and with the tower for example during assembly, storage, transport and installation of the tower at wind speeds leading to force amplitudes in the second regime, where work would otherwise need to be postponed.

In conclusion, the tower vibration damper of the present invention provides efficient damping of vortex induced tower vibrations by combining a permanently mounted tuned mass damper with one or more detachable impact damping units which when activated significantly reduce vortex generated tower vibrations. The permanently mounted tuned mass damper is intended for damping purposes of the assembled wind turbine generated, whereas the one or more impact damping units are dismounted and reused in another wind turbine tower.

In addition, tests have shown that the changing frequency response by the tower in the collision-limited mode of operation causes the effect of the vortex load, that would otherwise further increase the force amplitude and tower response, to diminish.

The present invention also relates to the use of a tuned mass damper as an impact damper in a wind turbine tower. The tuned mass damper has a pendulum and is operated by allowing the pendulum movement under the influence of the vibration of the tower be damped by a friction media. This movement does in normal operation not involve impacting the pendulum with the outer boundary of the chamber where the preventing is arranged during use as this would change the natural frequency of the tower to which frequency the tuned mass damper may be tuned. Surprisingly, the normal operation of the tuned mass damper was changed into an impact damper by providing impact damping units between the pendulum structure and the outer boundary of the chamber so that the vibration occasionally will lead to impact between the pendulum and the outer boundary of the chamber via the impact damping units and thereby reduce the vortex induced vibration of the tower.

The invention claimed is:

1. A wind turbine tower comprising a tower vibration damper, the tower vibration damper comprising
a tuned mass damper comprising:
   a pendulum structure suspended inside the wind turbine tower,
   a chamber comprising an outer boundary, the chamber connecting a friction media to the pendulum structure, and
   a suspension arrangement suspending the pendulum structure at least partially inside the chamber such that the pendulum structure is allowed to displace from a neutral position towards the outer boundary of the chamber, and
an impact damper comprising:
   one or more impact damping units laterally positioned between the pendulum structure and the outer boundary of the chamber so as to provide an opening either between the pendulum structure and the one or more impact units or between the outer boundary of the chamber and the one or more impact units when the pendulum structure is in the neutral position,
wherein the impact damper is adapted to be deactivated in order to prevent collision of the outer boundary and the pendulum structure via the impact damper.

2. The wind turbine tower according to claim 1, wherein the friction media is a damping liquid, and the outer boundary of the chamber has a bottom part extending between wall parts of the outer boundary, the chamber holding the damping liquid into which the pendulum structure is at least partly immersed.

3. The wind turbine tower of claim 1, wherein the pendulum structure includes an upper rim and a lower rim, the one or more impact damping units being position between the upper rim and the lower rim.

4. The wind turbine tower according to claim 1, wherein the impact damper is adapted to be deactivated by removing or relocating at least one of the impact damper units, changing the shape and/or dimensions of at least one of the impact damper units, or by rotating the pendulum structure relative to the outer boundary of the chamber.

5. The wind turbine tower according to claim 1, wherein the one or more impact damping units are detachably secured to the pendulum structure.

6. The wind turbine tower according to claim 1, wherein the one or more impact damping units are suspended from an upper rim of the pendulum structure.

7. The wind turbine tower according to claim 1, wherein the number of impact damping units is larger than two.

8. The wind turbine tower according to claim 7, wherein the impact damping units are evenly distributed around a centre axis of the pendulum structure and/or around a centre axis of the wind turbine tower.

9. The wind turbine tower according to claim 1, wherein each impact damping unit comprises one or more resilient fenders each having a durometer hardness of at least Shore 50A.

10. The wind turbine tower according to claim 9, wherein each impact damping unit comprises oppositely arranged first and second resilient fenders, wherein the first resilient fender faces the pendulum structure, and wherein the second resilient fender faces the outer boundary of the chamber.

11. The wind turbine tower according to claim 1, wherein the outer boundary of the chamber is formed by a part of a wind turbine tower wall.

12. The wind turbine tower according to claim 1, wherein the suspension arrangement comprises
   a plurality of wires for suspending the pendulum structure, and
   tuning means configured for adjusting the natural frequency of the suspended pendulum structure, the tuning means comprising, for each of said plurality of wires, a clamp secured to the wind turbine tower at one end and to the wire at the other end, wherein the securing of the clamp is configured such that the clamp is movable along a longitudinal direction of the wire.

13. A method of damping tower vibrations in a wind turbine tower, the method comprising the steps of
providing a tuned mass damper comprising:
   a pendulum structure suspended inside the wind turbine tower,
   a chamber comprising an outer boundary, the chamber connecting a friction media to the pendulum structure, and the outer boundary of the chamber has a bottom part extending between wall parts of the outer boundary, the chamber holding a damping liquid into which the pendulum structure is at least partly immersed, and
   a suspension arrangement, for suspending the pendulum structure at least partially inside the chamber such that the pendulum structure is allowed to displace from a neutral position towards the outer boundary of the chamber,
during assembly, storage, transport and/or installation of the wind turbine tower, providing an impact damper comprising:
   one or more impact damping units laterally positioned between the pendulum structure and the outer boundary of the chamber so as to create an opening either between the pendulum structure and the one or more impact units or between the outer boundary of the chamber and the one or more impact units when the pendulum is in the neutral position, wherein the impact damper is adapted to be deactivated in order to prevent collision of the outer boundary and the pendulum structure via the impact damper, and
activating the impact damper during assembly, storage, transport and/or installation of the wind turbine tower.

14. The method according to claim 13, further comprising the step of dismantling the impact damper when the wind turbine tower is no longer during assembly, storage, transport and/or installation.

* * * * *